Jan. 13, 1942.     A. C. BRUNS     2,270,211
THERMOMETER MOUNTING
Filed Oct. 16, 1939
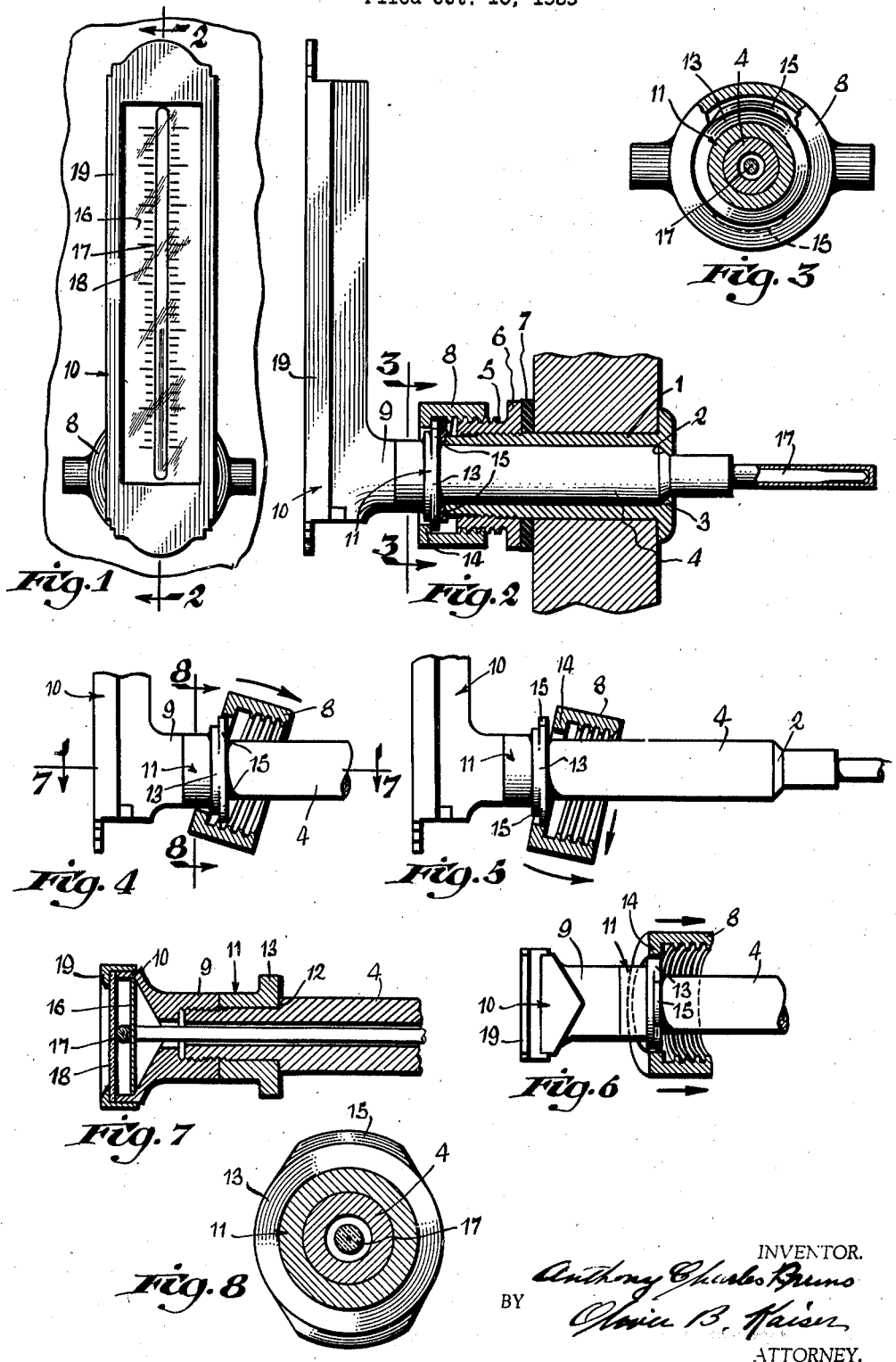
INVENTOR.
Anthony Charles Bruns
BY
Oliver B. Kaiser
ATTORNEY.

Patented Jan. 13, 1942

2,270,211

UNITED STATES PATENT OFFICE 2,270,211

THERMOMETER MOUNTING

Anthony Charles Bruns, Cincinnati, Ohio, assignor to The Palmer Company, Norwood, Ohio, a corporation of Ohio Application October 16, 1939, Serial No. 299,726

1 Claim. (Cl. 73—375)

This invention relates to improvements in thermometer mounting for tanks or vats and the like, and particularly to a type in which the bulb end of the thermometer extends through a bushing, lining an aperture in the wall of the tank or vat, and to which the thermometer casing connects.

The thermometer casing generally is of angular form, providing a horizontal tubular shank section which encloses the bulb end of the capillary tube extending into the tank and a perpendicular indicator or sight section embodying the graduations and reading end of the capillary tube. The shank section in its application to the tank extends through and connects with a bushing projecting through an aperture in the wall of the tank and fixed to the wall.

An object of the invention is to provide a thermometer casing with a ferrule or gland for anchoring a union nut of common construction and standard size screw-threaded upon the outer end of a bushing for removably connecting the casing to the bushing and in fluid tight union therewith with the bulb enclosing end of the casing extending into the tank, the union nut interfitting with the ferrule or gland to render the same capable of being removed or applied by canting the nut from its line or axis of concentricity with the ferrule or gland.

Further advantages and features of the invention will be more fully set forth in the description of the accompanying drawing, in which:

Figure 1 is a front elevation of the improved indicating thermometer for tanks and vats, or the like.

Figure 2 is a section on line 2—2, Figure 1.

Figure 3 is a section on line 3—3, Figure 2.

Figure 4 is a detail elevation of a portion of the thermometer, showing a step in the removal of the union nut employed for connecting the thermometer to a bushing engaged through an aperture in the tank or vat.

Figure 5 is a similar view to Figure 4, illustrating a further step in the removal of the union nut from the shank section of the thermometer casing.

Figure 6 is a top plan view of the thermometer with the union nut in section.

Figure 7 is a section on line 7—7, Figure 4.

Figure 8 is an enlarged section on line 8—8, Figure 4.

Referring to the drawing, 1 indicates a conventional bushing for lining an aperture through the wall of the tank or vat, and making a thermometer casing connection with the bushing to project the bulb end of the thermometer within the vat. The bushing has a flange at one or its inner end for a shoulder engagement with the inner side of the wall of the tank.

The bore of the bushing is counterbored to provide a conical seat 2 at its inner end engaged by a conical shoulder 3 of a lateral tubular shank 4 of the thermometer casing extending through the bushing for making a fluid tight joint connection with the bushing. The bushing is fixed in position by a flange coupling or lock nut 5 screw-threaded upon the outer end of the bushing and exterior of the tank, with the flange 6 thereof bearing against a gasket 7 interposed between the flange of the coupling nut and exterior side of the wall of the tank about the bushing.

The coupling nut or fitting 5 is exteriorly screw-threaded to receive a union or swivel nut 8, preferably of spanner type, engaged over the shank section 4 of the casing for removably clamping the thermometer casing to the bushing. The lateral shank section 4 of the thermometer casing has its rear end counterturned with the outer extremity thereof screw-threaded for connection into a lateral hub 9 integral with the base of an indicator section 10 of the thermometer casing.

A flanged ferrule 11 is engaged upon the counterturned end of the shank section 4 of the thermometer casing. The opposite ends of the ferrule relatively respectively abut the end of the hub and shoulder 12 of the shank section formed by counterturning the end of the shank, and is frictionally clamped thereto upon tightening up the shank section within the hub of the indicator section of the thermometer casing. The periphery of the flange 13 of the ferrule is of circular contour to provide a swivel fit or joint with the inner periphery of an inturned flange or collar 14 of the union nut 8, which is screw-threaded upon the coupling nut or fitting 5. The flange of the ferrule is provided with a pair of diametrically opposite lugs 15, 15, for a shoulder engagement with the inner side or surface of the inturned flange 14 of the union nut, adapting the nut to obtain a clenching hold on the ferrule for assembling and connecting the shank of the casing within and to the bushing, and bring the conical shoulder of the shank into fluid tight union with the internal seat of the bushing.

The lugs 15, 15, furnish partial protuberances for the periphery of the flange of the ferrule, sufficient to obtain a substantial hold upon the inturned flange of the union nut, and at the same time permit the union nut to be conveniently inserted and removed or slipped off from its union with the ferrule by slightly canting the nut out of its line of concentricity with the ferrule and shank, as illustrated in Figures 4, 5, and 6, when detached from the bushing for its withdrawal from or application upon the shank section of the thermometer casing.

The advantage offered is that the swivel union nut is a standard part of conventional construction, of which a numerous quantity are in use and approved, for example, by the dairy industry, this industry being large users of the type of thermometer herein exemplified, so that the nut does not in anywise have to be altered or changed for use with the improved ferrule as an element of the thermometer casing, and substitution of the thermometer can be readily made with the standard bushing with which the tank or vat is equipped. The ferrule is rotatably adjustable upon the shank section, to extend the lugs or glands to a radial degree of angle.

The nut does not have to be large, as in some cases where it is made to slip entirely over the thermometer case; which, however, is excessive in size and out of proportion to the balance of the thermometer structure.

The indicator section of the thermometer 10 is of conventional construction which has its front face recessed to receive a graduation plate 16 and the indicating end or section of a capillary tube 17, with the bulb end of the tube extending into and enclosed by the shank section of the casing. The recess of the indicator section of the casing has a glass or transparent plate closure 18 secured in place by a frame 19 fixed to the indicator section in the usual manner.

Having described my invention, I claim:

A thermometer mounting for tanks, vats, and the like, comprising: a bushing for lining an aperture in a wall of a tank having an annular seat at the inner end in the bore thereof, a lock nut screw-threaded upon the outer end of the bushing for securing the bushing to the tank wall, a thermometer casing for enclosing a capillary tube having a laterally extending tubular shank for the bulb end of the capillary tube, the shank projecting through the bushing to extend beyond the inner end thereof and provided with an annular shoulder cooperating with the seat in the bushing, a pair of diametrically opposite lugs radially extending therefrom, and a union nut enveloping said lugs and having an annular inturned flange for engagement with the lugs, said union nut being screw-threaded upon the outer periphery of said lock nut for securing the casing shank to the bushing with the annular shoulder thereof compressively against the bushing seat, the internal diameter of the union nut threaded on the periphery of the lock nut having an internal diameter of greater dimension than the diametrically opposed lugs which the union nut envelopes thereby adapting the same when the thermometer shank is removed from the bushing to be removed from the lugs by canting the union nut upon the shank and be slipped therefrom and off from the free end of the shank.

ANTHONY CHARLES BRUNS.